Dec. 6, 1960   G. T. RONK   2,963,302
COUPLING MECHANISM FOR TRAILERS AND TRACTORS
Filed March 31, 1958   3 Sheets-Sheet 1
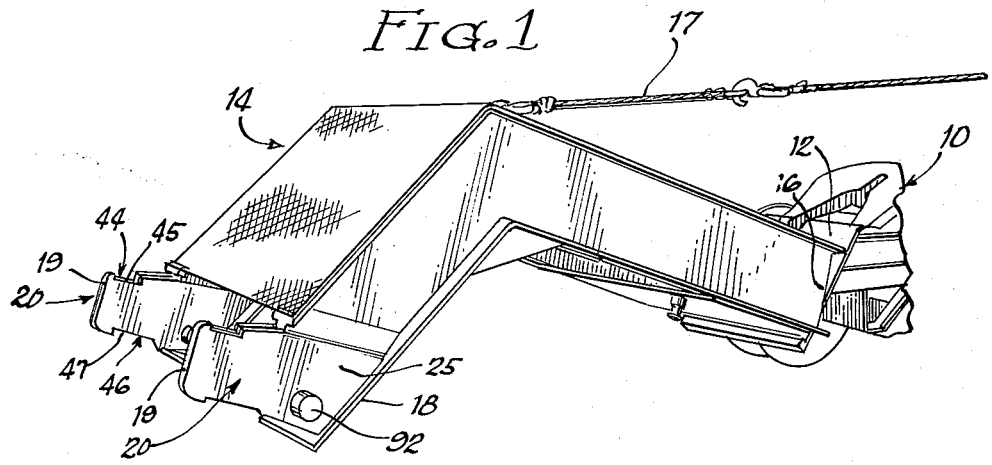
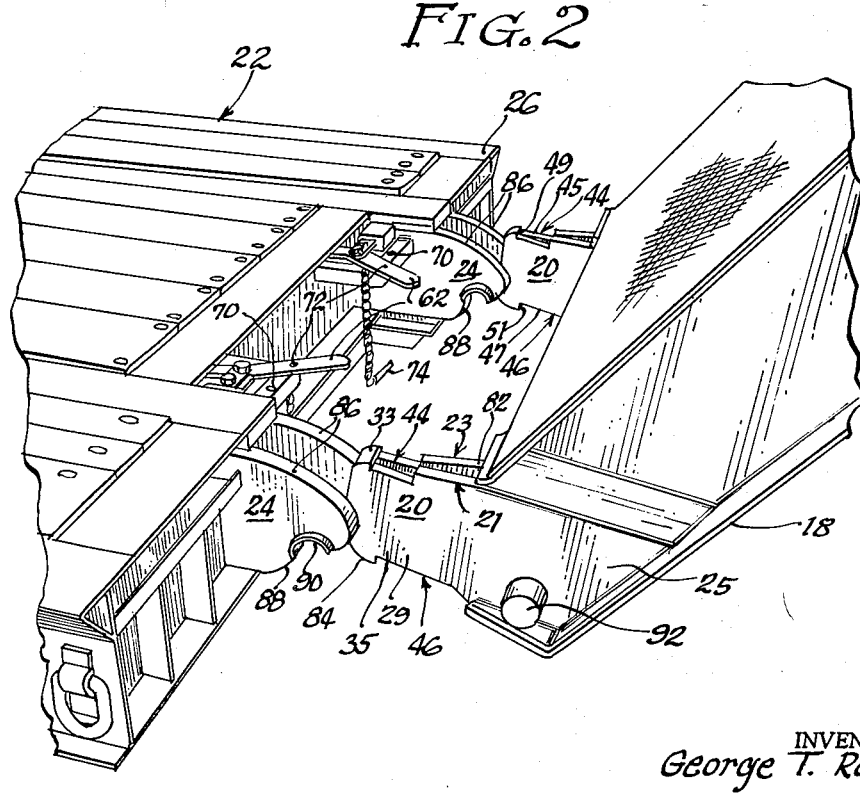
INVENTOR.
George T. Ronk
BY
Dome, McDougall, Williams & Hersh
Attorneys Dec. 6, 1960
G. T. RONK
2,963,302
COUPLING MECHANISM FOR TRAILERS AND TRACTORS
Filed March 31, 1958
3 Sheets-Sheet 2
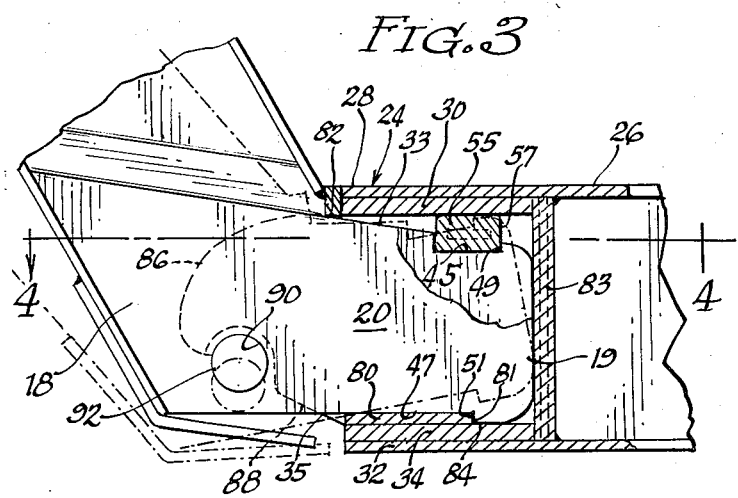
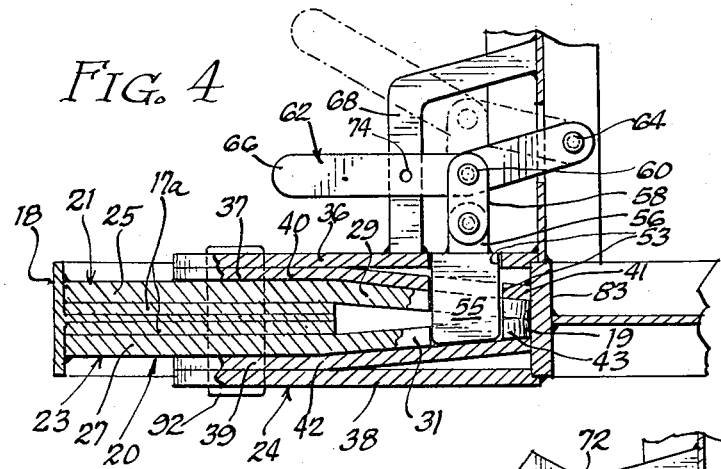
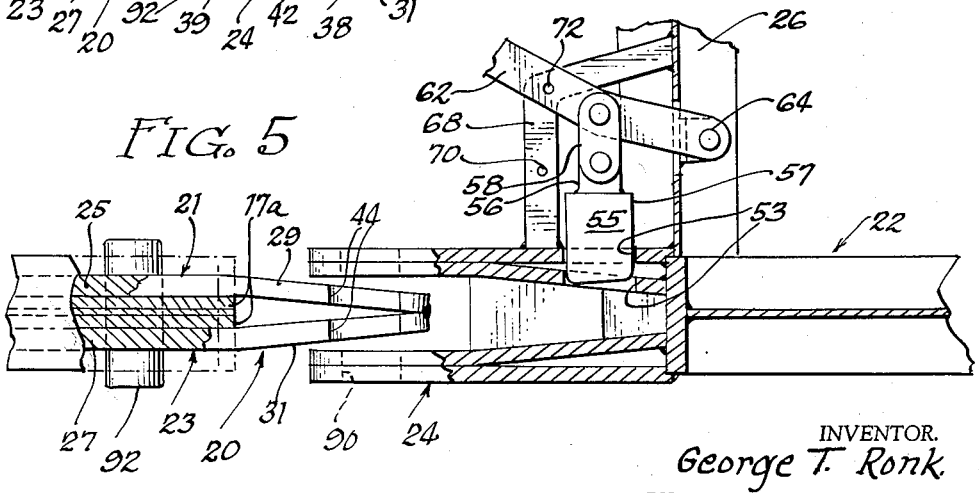
INVENTOR.
George T. Ronk
BY
Ooms, McDougall, Williams & Hersh
Attorneys

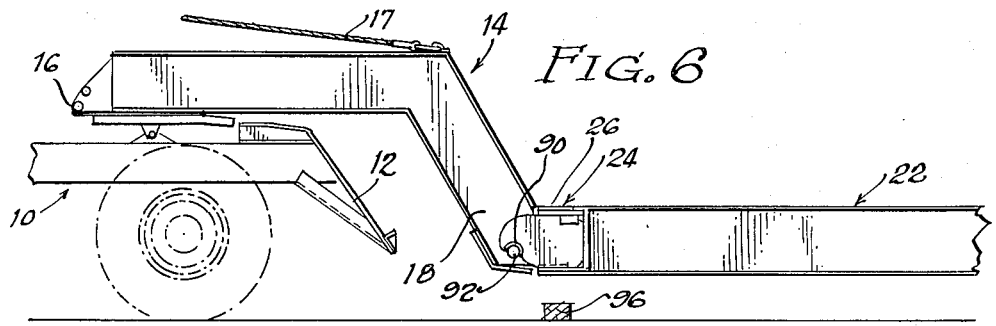
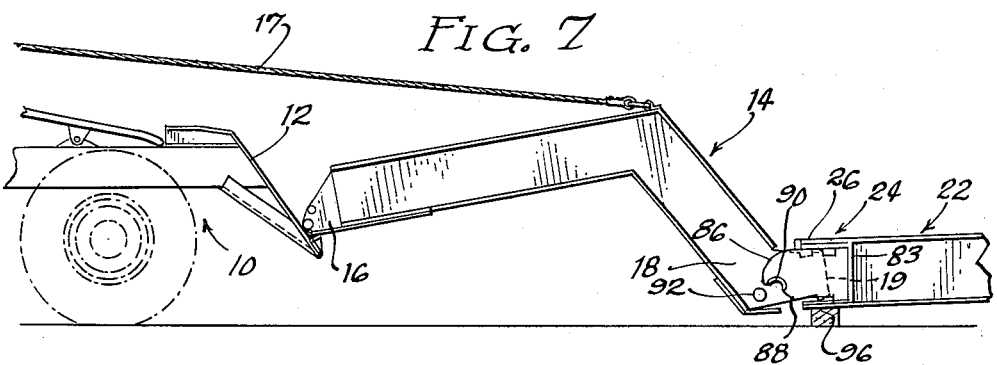
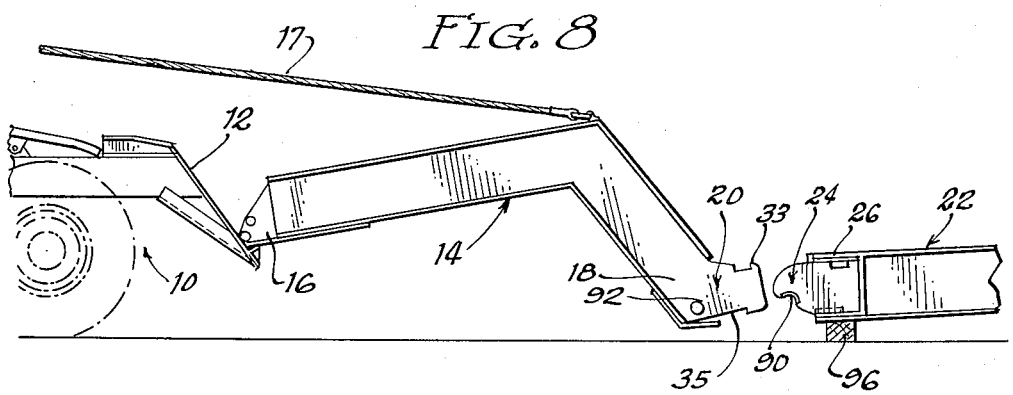

United States Patent Office 2,963,302
Patented Dec. 6, 1960

2,963,302

COUPLING MECHANISM FOR TRAILERS AND TRACTORS

George T. Ronk, Cedar Rapids, Iowa, assignor to Transport Trailers, Inc., Cedar Rapids, Iowa Filed Mar. 31, 1958, Ser. No. 725,122

4 Claims. (Cl. 280—425)

This invention relates to a coupling and more particularly to a coupling for detachably connecting a tractor to a trailer.

This application is a continuation-in-part of my copending application Ser. No. 603,133, filed August 9, 1956, now Patent No. 2,894,764, and entitled "Trailer-Tractor Assembly with Removable Gooseneck."

As indicated by the description in the above mentioned copending application, the trailer forming the subject matter of a part of this invention comprises a low bed heavy duty trailer having a group of wheels at the rear end for its support. The forward end is adapted to be connected to and supported by a crane or gooseneck which is carried by the tractor for movement therewith.

Low bed trailers of the type described are intended for use in the transportation of large and very heavy pieces of machinery and equipment, where the head room available on the highways may not be sufficient to enable such equipment and machinery to be mounted on trailers having a normal ground clearance. Very often these trailers carry machinery, such as tractors, which may have a limited motive power, or which may be mounted on wheels. Consequently it is often desirable to load them by disconnecting the front end of the trailer from the gooseneck so that with the help of a small ramp such machinery can be driven or pushed onto the trailer.

Separation of the gooseneck from the trailer leads to a number of difficult problems in reconnecting them together after the trailer is loaded. The most difficult of these is in attaining a proper alignment of the coupling members to produce the required connection. This is essential because the coupling members typically comprise a pair of male or horn members and a pair of female or socket members. One of these pairs is integrally secured to the rearward end of the gooseneck and the other is secured to the forward end of the trailer. When the forward end of the trailer is in a dropped or lowered position for loading, after being disconnected from the rear end of the gooseneck, the coupling members on the trailer will be spaced below and angularly inclined with respect to the coupling members on the gooseneck. This misalignment may be further complicated by the varying levels and slope of the ground beneath the tractor and trailer. One way to align the coupling members under these conditions was to pivotally mount the forward end of the gooseneck on the tractor, so that the rear end of the gooseneck with its integral coupling members can be pivoted into substantial linear alignment with the coupling members on the trailer. Some of the structures for doing this are described in the above mentioned copending application.

It must, however, be realized that the trailer is designed to carry very heavy loads so that the gooseneck must be strong and massive itself in order to support the trailer. For that reason it is difficult to control the gooseneck with enough precision to quickly align the coupling members without resorting to an inordinately expensive mounting and control system. One approach to this problem has been to use tapered horn and socket members for the couple. In this way, the entrance to the socket opening would be larger than the end of the horn so that as the tractor backed toward the trailer, when the coupling members were slightly out of alignment with each other, the engagement of the horn members with the inner surfaces of the socket would cause them to be cammed into alignment with each other as the horns were rammed home. This approach was partially successful, but it was of limited value because of the heavy loads involved. These heavy loads made it necessary that the coupling members closely interfit into each other so that they can act as an integral unit for maximum strength. Any looseness in the fit of these coupling members would weaken their connection and would cause very rapid wear. These considerations required that either the angle of the taper be small which decreased the benefit of using tapered coupling members since they then had to be carefully aligned, or else to use large taper angles, which required that the length of the coupling members be large to insure a tight or snug fit, but this greatly multiplied the cost of the coupling members and introduced other design problems.

Another problem connected with the use of tapered coupling members is that once the horn is inserted inside the socket it must be positively locked therein. Heretofore, this required that a locking pin be provided which was inserted in aligned transverse holes in the horn and socket, see Fig. 7 in the copending application. As seen in that case, both the locking pin and the aligned holes were tapered, to avoid any looseness in the connection, because such looseness would subject the locking pins to very large shearing forces which could break them, and which would destroy the integral character of the couple. This taper in both the locking pins and the aligned holes required the pins to be forcibly driven into them to get the connection between the coupling members as secure and tight as possible. This created very difficult problems because once these pins were forcibly driven into the aligned tapered openings, and after the tractor had pulled the heavily loaded trailer for a while, distortions in the metal would jam the pins inside these openings and would make it a very difficult and time consuming job to withdraw them.

Another objection to the use of tapered male and female coupling members and the transverse locking pins was that the male members could enter and leave the opening in the female members by moving in straight lines so that the locking pins had to carry the pulling load exerted by the tractor. This meant that if the transverse locking pins should break while the tractor was pulling the trailer, then the tractor and trailer would immediately separate.

What is needed, therefore, and comprises the principal object of this invention is a coupling including horn and socket members wherein the socket member is larger than the horn member to facilitate the entrance of the horn into the socket, and where means are provided for changing the configuration of the socket to provide a snug fit between the horn and socket after the horn member is inserted therein so that the coupling can act as an integral unit.

Another object of this invention is to provide a coupling for connecting a tractor to a trailer including horn and socket members and a locking means whereby the horn member is locked inside the socket, and where the horn and socket are provided with means for preventing forces acting on the coupling which are aligned with or transverse to the coupling members from causing them frictionally and tightly to grip the locking means.

Still another object of this invention is to provide a coupling including horn and socket members where the socket member is larger than the horn member to facilitate the entrance of the horn therein, and where combined means are provided both for locking the horn in the socket and for changing the configuration of the socket to provide a snug fit between the horn and socket members after the horn has been inserted therein so that the coupling can act as an integral unit.

Yet a further object of this invention is to provide a coupling including horn and socket members where the socket member is larger than the horn member to facilitate the entrance of the horn therein, and where combined means are provided both for locking the horn in the socket and for changing the configuration of the socket to provide a snug fit between the horn and socket members after the horn has been inserted therein so that the coupling can act as an integral unit, and where the horn and socket members are also provided with additional structure for preventing forces acting on the coupling which are aligned with or transverse to the coupling members from causing them frictionally and tightly to grip the combined means.

Still another object of this invention is to provide a horn and socket coupling for connecting a tractor to a trailer where the end of the horn has to be pivoted inside the socket both to connect the coupling members together and to disconnect them.

Another object of this invention is to provide a coupling which is strong, durable, and easy to manufacture.

These and other objects of this invention will become more apparent when read in connection with the accompanying drawings and specifications wherein:

Fig. 1 is a perspective view of the gooseneck with spaced parallel coupling horns integrally secured to the rear portion;

Fig. 2 is a perspective view of the rear portion of the gooseneck and the front portion of the trailer showing the horns about to be inserted into the sockets;

Fig. 3 is a side sectional view of the socket with the horn inside and showing in dotted lines the pivotal position of the horn inside the socket;

Fig. 4 is a sectional view taken on the line 4—4 of Fig. 3 and looking in the direction indicated;

Fig. 5 is a view similar to that of Fig. 4 but with the horn partially removed from the socket;

Fig. 6 is a side elevational view of a portion of the tractor and trailer showing the gooseneck attached at its front end to the tractor with the horn on its rear end coupled inside the socket at the front end of the trailer;

Fig. 7 is a side elevational view of a portion of the tractor and trailer showing the position of the gooseneck as the horn on its rear end is about to be separated from the socket at the front of the trailer, and Fig. 8 is a side elevational view of a portion of the tractor and trailer showing the position of the gooseneck as the horn on its rear portion is completely separated from the socket on the trailer.

Referring now to Figs. 1 and 2 of the drawings, a tractor indicated generally by the reference numeral 10 is provided with a downwardly inclined ramp 12. A crane or gooseneck indicated generally by the reference numeral 14 has a front portion 16 which is adapted pivotally to engage the ramp 12. A cable 17 extending from a winch (not shown) mounted on the tractor and connected to the gooseneck is provided for controlling the angle of inclination of its rear or end portion 18. This rear or end portion is provided with a pair of laterally spaced apart horns or male coupling members extending rearwardly in parallel relation from the end 18 and indicated generally by the reference numeral 20. The low bed trailer, indicated generally by the reference numeral 22, is provided with spaced parallel forwardly projecting sockets or female coupling members, indicated generally by the reference numeral 24, for receiving the rearwardly projecting horns or male members 20, as shown in Fig. 2, so that the tractor and trailer may be coupled together. These coupling members are integral with the front portion 26 of the trailer and may be formed from extensions of the trailer support frame.

The socket members 24, as seen in Figs. 3 and 4, are provided with upper and lower walls 28 and 32 which may also include coextensive and integrally attached reinforcing walls 30 and 34. The reinforcing walls 30 and 34 may be integrally secured to the rear or back wall of the socket by any conventional means (not shown). The socket further includes spaced parallel external side walls 36 and 38, see Fig. 4, to which are secured internal reinforcing side walls 37 and 39. These internal reinforcing walls have parallel forward portions 40 and 42 which are coextensive with and integrally secured to a portion of the inner surface of the external side walls, and they have integrally attached rearwardly converging portions 41 and 43, see Fig. 4, for purposes to be described below.

The horns or male members 20, as seen in Fig. 2, comprise side plates indicated generally by the reference numerals 21 and 23. These side plates have spaced parallel front portions 25 and 27, see Fig. 4, which are integrally secured to the rear portion 18 of the gooseneck by any conventional means (not shown). The rear portions 29 and 31 of these side plates define the side surfaces of the horn, and they converge at the same angle as the converging side wall portions 41 and 43. The spacing between the side plates of the horn may be filled by filler plates 17a and the dimensions of the horn are designed to provide a snug horizontal fit between the horn and socket after the horn is inserted completely therein, see Fig. 4. Since the rear portions 29 and 31 of the horn do converge together, the horizontal spacing at the forward end of the socket will be substantially greater than the horizontal thickness of the rear end 19 of the horn and this will facilitate the entrance of the horns in the socket, by decreasing in some measure the requirement that the horn and socket be precisely horizontally aligned. The upper and lower edges of the rear portions 29 and 31 of the horn define upper and lower end surfaces 33 and 35, see Fig. 3. These ends also converge toward each other, but the upper and lower walls 28 and 32 of the socket 24 do not, so that the height of the side walls of the socket opening are larger than the height of the rear or end part of the converging side surfaces of the horn, and this will be true even after the horn is completely inserted in the socket, see Fig. 3. This provides a loose fit in the vertical direction between the horn and socket which facilitates the entrance of the horn therein and also permits the rear portion 19 of the horn 20 to pivot in the rear of the socket 24, as shown by the dotted lines in Fig. 3. This is important because the massive gooseneck usually pivots more freely in the vertical direction and so the resulting decrease in the degree of alignment required greatly expedites the connection of the gooseneck to the trailer. The upper and lower end surfaces 33 and 35 of the horn or male member 20 are provided with locking grooves indicated generally by the reference numerals 44, and 46, see Fig. 2. The bases 45 and 47 of these grooves are planar and are perpendicular to the rear locking walls 49 and 51 of the grooves, for purposes to be described below, see Fig. 2.

Both the external and reinforcing side walls 36 and 37 of the sockets 24 are provided with transverse aligned openings 53, see Figs. 4 and 5, which are adapted to receive a slide bar 55 substantially rectangular in cross-section and extending perpendicularly to the horns. When the coupling members are connected together this slide bar is adapted to enter grooves 44 on the horns. For this reason, the base of the slide bar is equal in width to the width of the groove, so that when the slide bar is in the groove, its edge surface will abut against the locking walls 49. A projection 56 is integrally formed on the lateral end portion of the slide bar, and this projection is connected to one end of a small connecting link 58. The opposite end 60 of this connecting link is pivotally connected to the intermediate portion of an operating lever, indicated generally by the reference numeral 62. One end 64 of this operating lever is pivotally connected to the front frame of the trailer 22, and the other end 66 provides a handle for the lever whereby the slide bar 55 can be conveniently moved in and out of the socket member 24, see Figs. 4 and 5. An angularly bent reinforcing bar 68 is secured, by welding or any conventional means, to the outer surface of the external side wall 36 and to the forward end 26 of the trailer. This reinforcing bar 68 is provided with an opening 70, see Fig. 5, which is adapted to be aligned with an opening 72 formed in the handle 66 of the operating lever 62, see Fig. 4. The openings are adapted to receive a locking pin 74, see Fig. 2, which locks the slide bar 55 inside the socket 24, as shown in Fig. 4.

When the horn 20 is properly inserted in the socket 24, the operating lever 62 is actuated and the slide bar 55 moves into the socket 24 and into the top locking groove 44, see Fig. 3. As seen, when the slide bar 55 is in the groove 44 with one surface resting on the base 45, the opposite surface abuts against the inner surface of the top reinforcing wall 30. This alters the internal configuration of the socket and thereby changes the above described initial loose fit between the horn and the socket into a snug fit, so that the entire coupling acts as an integral unit. In addition, the slide bar 55 has a double function because the engagement of the edge of the slide bar with the perpendicular rear wall 49 of the locking groove 44 locks the horn 20 snugly inside the socket, and couples the gooseneck to the trailer. These structural features are important because any looseness between the coupling members when the tractor is pulling a heavily loaded trailer would subject the coupling members to severe strains and would cause very rapid wear.

As seen in Fig. 3, a locking plate 80 is rigidly secured to the inner surface of the reinforcing wall 34 at the front of the socket opening by any conventional means. Its rear edge 81 is in spaced relation to the rear wall 83 of the socket. When the horn 20 is properly positioned inside the socket for connection thereto, this locking plate will penetrate locking groove 46 and will lie in coextensive engagement with the base 47 of the groove and with its rear edge 81 abutting against the perpendicular wall 51 of the groove, to thereby supplement the locking effect of the slide bar 55. The horn and socket are designed so that the distance between the highest point 82 on the end surface 33 and the lowest point 84 on the end surface 35 of the horn member corresponds to the vertical size of the rear portion of the socket opening. This means that with the locking plate 80 obstructing the front of the socket opening, the horn should not be inserted into the socket by moving it in a straight line. Instead, the horn should be pivoted inside the socket into locking position, as shown by the dotted lines in Fig. 3. This permits substantial misalignments to exist between the horn and socket without appreciably hampering the ability to connect the gooseneck to the trailer. Furthermore, just as the horns should be pivoted into position inside the sockets to connect them together, so also should they be pivoted out of alignment to permit the horn to be withdrawn. This is an important safety feature, since even if the slide bar 55 breaks or slides out of opening 53, while the tractor and trailer are in motion, no separation will occur.

The forward portions of the side walls of the socket extend beyond the front edge of the upper and lower socket walls which define the front of the socket opening, see Fig. 2. These forwardly projecting side wall portions have opposed upper and lower ends 86 and 88 which are arcuately curved and which generally converge toward each other. A half bearing 90 is formed in each of the lower inclined ends, and these half bearings open in a forward and downwardly inclined direction. It is possible, however, that these half bearings could be formed in the upper inclined ends as well, in which case they could open in a forward upwardly inclined direction. If this change was made, it is apparent that the angular relationship between the horn and the gooseneck 14 would have to be modified to reflect this variation.

Pin members 92 having a diameter substantially equal to the diameter of the half bearings are integrally secured to and oppositely projecting from the forward sides 25 and 27 of the horns 20. These pin members are designed to fit in the half bearings 90 when the horns 20 are properly positioned and aligned in the socket 24. This structural feature is extremely important since these pins and half bearings carry the principal load between the trailer and the gooseneck and so prevent forces on the tractor and trailer which are aligned with or transverse to the coupling members from causing them to frictionally grip the slide bar 55 and prevent its removal. This is evident from an inspection of Fig. 6, where it can be seen that a heavy load carried by the trailer would exert a vertical force on the socket which could cause the slide bar 55 to be tightly held between the horn and the socket, if it were not for the pins and half bearings which carry these forces. So with this structure, regardless of the weight carried by the trailer, the slide bar can always be easily removed from the socket to quickly and conveniently decouple the tractor from the trailer.

Figs. 6, 7 and 8 show the procedure for disconnecting the tractor from the trailer. First, a block 96 is positioned underneath the front portion 26 of the trailer. Then with the trailer brakes set, the pin 74 is withdrawn from the openings 70 and 72 and the operating lever 62 is actuated to withdraw the slide bars 55 from the sockets. Next the fifth wheel, or its equivalent, on the tractor is unlocked and the tractor is moved forward slowly until the front end portion 16 of the gooseneck 14 rests on the ledge of the ramp 12. This causes the rear portion 18 of the gooseneck and the front portion of the trailer to pivot downwardly. As this happens the pins 92 on the horns move lower than the half bearings 90 on the socket, because they move in an arc having a smaller radius of curvature, see Fig. 7. In this position, it is seen that the front end of the trailer rests on the supporting block 96. Next the winch cable 17 is drawn tight to support the gooseneck 14 in the position shown in Figs. 7 and 8, and the truck is then driven away.

To reconnect the tractor and trailer, a reverse procedure is followed. First the tractor is backed into engagement with the gooseneck. If the forward end portion 16 of the gooseneck is below the ledge at the lower end of the ramp 12, the cable 17 from the winch is connected to the forward end of the gooseneck to pull the end of the gooseneck upwardly onto the ramp. Next the cable 17 is connected to the rearward end portion of the gooseneck, as shown in Fig. 1, whereby the winch can be used to rock the gooseneck about its forward end portion in engagement with the ramp as a pivot. Thus the gooseneck can be rocked about the ramp to raise or lower the rearward end portion until the horns are in substantial alignment with the sockets.

With the gooseneck in this position, the tractor is backed up until the tapered horns can enter the enlarged forward portion of the socket opening, see Fig. 7. As the horns enter the sockets their engagement with the walls of the sockets causes them to pivot, and this automatically centers and lines up the gooseneck with the front of the trailer frame. When the ends 19 of the tapered horns 20 contact the back wall 83 of the sockets, the continued rearward motion of the tractor pivots the horns into alignment with the sockets as shown in Fig. 6. This brings up the pin members 92 into contact with the half bearings 90, making the connection between the gooseneck and the tractor complete. Then a continued force on the winch cable 17 and a continued rearward motion of the tractor completes the connection between the gooseneck to the fifth wheel or its equivalent. The slide bars 55 are moved into position inside the socket to lock the horn therein and to provide a close fit between the socket and horn. To hold the slide bar inside the sockets, the pins 74 are then inserted through the aligned holes 70 and 72 as described above.

After the connection has been effected, the cable 17 is joined to the front end of the gooseneck and the winch is operated to displace the gooseneck up the ramp and onto the fifth wheel whereby a pivotal connection can be established as defined in the aforementioned application.

The invention may be embodied in other forms without departing from the spirit or essential characteristics thereof as set forth in the claims, and the present embodiment is therefore to be considered as illustrative and not restrictive and it is intended to include all changes which come within the scope and range of the claims.

I claim:

1. A coupling for connecting a tractor to a trailer comprising a gooseneck, said gooseneck having one end pivotally connected to the tractor and having a free end extending rearwardly thereof, a readily detachable coupling between the free end of said gooseneck and said trailer, said coupling comprising a coupling member on said free end of the gooseneck and a complementary coupling on the front end of the trailer, one of said coupling members comprising a male member and the other a female member, said female member comprising a socket having at least converging side walls, said male member having converging side surfaces which converge at substantially the same angle as the converging side walls of the female member, the socket opening in said female member larger in one dimension than the corresponding dimension on the end portion of the male member to facilitate the entrance of said male member in said socket opening and expedite the connection of said gooseneck to the trailer, and combined means adapted to penetrate the socket opening and engage a portion of one of the external surfaces of the male member to restrict the enlarged dimension in the socket opening and both provide a snug fit for said male member and lock the male member therein, each of said side walls having a projecting portion which extends beyond the socket opening, each of said projecting portions provided with a bearing member, said male member provided with integral means receivable in said said bearing when said male member is in said socket to prevent forces on the trailer or tractor which are aligned with or transverse to the direction of coupling of said male members from causing said coupling members frictionally and tightly to grip said combined means.

2. A coupling for connecting a tractor to a trailer comprising a gooseneck, said gooseneck having one end pivotally connected to the tractor and having a free end extending rearwardly thereof, a readily detachable coupling between the free end of said gooseneck and said trailer, said coupling comprising a coupling member on said free end of the gooseneck and a complementary coupling on the front end of the trailer, one of said coupling members comprising a male member and the other a female member, said female member comprising a socket including at least converging side walls, said male member having converging side surfaces which converge at substantially the same angle as the converging side walls of the female member, the ends of said side surfaces of the male member defining end surfaces, the socket opening in said female larger in one dimension than the corresponding dimension on the end portion of the male member to facilitate the entrance of said male member therein and expedite the connection of said gooseneck to said trailer, an opening in at least one of the converging side walls of the female member, a bar adapted to penetrate said opening and engage a portion of one of the end surfaces of the male member both to restrict the size of the socket opening in the enlarged dimension and thereby provide a snug fit for the male member in the socket and to lock the male member therein, each of said side walls having a projecting portion extending beyond the socket opening, said projecting portions having opposed edges, at least one of the opposed edges inclined to the direction of its projection whereby the edges of said projecting portions are generally convergent, a half bearing formed in coil of said inclined edges, said male member provided with transverse pins, said pins receivable in said half bearings when said male member is in said socket to prevent forces aligned with or transverse to the coupling members from causing them frictionally and tightly to grip said bar.

3. A coupling for connecting a trailer to a tractor comprising a gooseneck, said gooseneck having one end pivotally connected to the tractor and having a free end extending rearwardly thereof, a readily detachable coupling between the free end of said gooseneck and said trailer, said coupling comprising a coupling member on said free end of the gooseneck and a complementary coupling member on the front end of the trailer, one of said coupling members comprising a male member and the other a female member, said female member comprising a socket defined by at least converging side walls, a top wall, and a bottom wall, said male member having converging side surfaces which converge at substantially the same angle as the converging side walls of the female member, the end of said side surfaces of the male member defining converging end surfaces, said converging end surfaces provided with lock bar receiving grooves, said grooves having a planar base portion and at least one adjacent substantially perpendicular locking wall, the socket opening in said female member larger in one dimension than the corresponding dimension on the end portion of the male member to provide a very loose fit between the coupling members to facilitate the entrance of said male member therein and expedite the connection of said gooseneck to said trailer, an opening in at least one of the converging side walls of the female member, a slide bar rectangular in cross-section and having one dimension equal to the width of the planar base portion of one of the grooves, said slide bar adapted to penetrate said opening and slide into said one groove with one of its surfaces abutting against said planar base portion and another surface abutting against perpendicular locking wall in the groove, both for restricting the size of the socket opening in the enlarged dimension to thereby provide a snug fit for the male member in the socket and for locking the male member therein, linkage means connected to said slide bar for moving it into and out of said socket, means adapted to be connected to said linkage means for locking said slide bar inside said socket, a locking and obstructing bar rectangular in cross-section and having one dimension equal to the width of the other of said locking grooves in the male member rigidly secured to the bottom wall of said socket at the entrance of said socket opening and in spaced relation to the end of said socket to require the male member to be pivoted into alignment with the female member inside said opening to prevent the male member from moving into or out of engagement with the female member by moving in straight lines, said locking and obstructing bar movable into said other locking groove in the male member when said male member is pivoted into alignment with the female member whereby one surface on said locking and obstructing bar moves into coextensive engagement with the planar base surface of said groove, and another surface of said locking and obstructing bar abuts against the perpendicular locking wall of the groove thereby to supplement the locking by the slide bar, each of said socket side walls having a projecting portion extending beyond the socket opening, said projecting portion having opposed edges, at least one of the opposed edges inclined to the direction of its projection whereby the edges of said projecting portions are generally convergent, a half bearing formed in one inclined edge of each projecting portion, said male member provided with integral transverse pin members, said pin members receivable in said half bearings when said male member in said socket is pivoted into alignment with said female member to prevent forces on said tractor and trailer which are aligned with or transverse to the direction of coupling of said male and female members from causing said coupling members frictionally and tightly to grip said slide bar.

4. A coupling of the class described including a male member and a female member, said female member comprising a socket and including at least side walls, locking means adapted to penetrate the socket opening to engage and hold the male member therein, said side walls having a projecting portion extending beyond the socket opening, each of said projecting portions provided with at least one edge inclined to the direction of its projection whereby the edges of said projecting portions are generally convergent, a half bearing formed in each of said inclined edges, said male member provided with integral transverse pin members, said pin members receivable in said half bearings when said male member is in said socket to prevent forces aligned with or transverse to the coupling members from causing the said coupling members frictionally and tightly to grip said locking means.

References Cited in the file of this patent

UNITED STATES PATENTS

| | | |
|---|---|---|
| 2,489,112 | Talbert | Nov. 22, 1949 |
| 2,590,210 | Rogers | Mar. 25, 1952 |
| 2,854,162 | Keir | Sept. 30, 1958 |